(12) United States Patent
Lei

(10) Patent No.: US 11,741,648 B2
(45) Date of Patent: Aug. 29, 2023

(54) ELEMENT RENDERING METHOD AND APPARATUS, COMPUTER READABLE STORAGE MEDIUM, AND COMPUTER DEVICE

(71) Applicant: Tencent Technology (Shenzhen) Company Limited, Guangdong (CN)

(72) Inventor: Danxiong Lei, Shenzhen (CN)

(73) Assignee: TENCENT TECHNOLOGY (SHENZHEN) COMPANY LIMITED, Guangdong (CN)

( * ) Notice: Subject to any disclaimer, the term of this patent is extended or adjusted under 35 U.S.C. 154(b) by 32 days.

(21) Appl. No.: 17/354,313

(22) Filed: Jun. 22, 2021

(65) Prior Publication Data

US 2021/0312680 A1    Oct. 7, 2021

Related U.S. Application Data

(63) Continuation of application No. PCT/CN2020/084502, filed on Apr. 13, 2020.

(30) Foreign Application Priority Data

May 6, 2019    (CN) .......................... 201910370800.5

(51) Int. Cl.
  *G06T 11/60* (2006.01)
  *G06F 16/24* (2019.01)
  (Continued)

(52) U.S. Cl.
  CPC .......... *G06T 11/60* (2013.01); *G06F 16/2237* (2019.01); *G06F 16/248* (2019.01); *G06T 11/001* (2013.01); *G06T 11/203* (2013.01)

(58) Field of Classification Search
  None
  See application file for complete search history.

(56) References Cited

U.S. PATENT DOCUMENTS 6,396,593 B1    5/2002 Laverty et al.
8,467,666 B2 *  6/2013 Okuda .................... H04N 5/85
                                                     386/355
(Continued)

FOREIGN PATENT DOCUMENTS

CN    101625848 A    1/2010
CN    101833542 A    9/2010
(Continued)

OTHER PUBLICATIONS

International Search Report and Written Opinion for priority application No. PCT/CN2020/084502 dated Jul. 17, 2020, 9p, in Chinese language.

(Continued)

*Primary Examiner* — Tapas Mazumder
(74) *Attorney, Agent, or Firm* — Crowell & Moring LLP

(57) ABSTRACT

Element rendering method and devices, a computer-readable storage medium, and a computer devices are disclosed. The method includes: acquiring at least one to-be-rendered element and a target display position corresponding to each to-be-rendered element; searching a locally stored element bitmap for each to-be-rendered element; if the to-be-rendered element is found from the element bitmap, determining an arrangement position of the to-be-rendered element in the element bitmap; otherwise, drawing the to-be-rendered element in an empty area, and determining an arrangement position of the drawn to-be-rendered element in the element bitmap; and triggering to render and display each to-be-rendered element at a corresponding target display position based on the element bitmap of each to-be-rendered element and the arrangement position of each to-be-rendered element in the element bitmap. The solution provided by this application can efficiently draw rendering elements.

20 Claims, 8 Drawing Sheets

(51) Int. Cl.
*G06F 16/22* (2019.01)
*G06F 16/248* (2019.01)
*G06T 11/00* (2006.01)
*G06T 11/20* (2006.01)

(56) References Cited

U.S. PATENT DOCUMENTS

| | | | |
|---|---|---|---|
| 8,941,663 | B2 | 1/2015 | Liao |
| 9,424,673 | B2 | 8/2016 | Otero et al. |
| 10,249,062 | B2 | 4/2019 | Shin |
| 2006/0146362 | A1 | 7/2006 | Romney |
| 2006/0285138 | A1 | 12/2006 | Merz et al. |
| 2015/0077769 | A1* | 3/2015 | Chigusa ............... H04L 67/10 358/1.5 |
| 2016/0328792 | A1* | 11/2016 | Blandford ............ G06F 16/248 |
| 2018/0113932 | A1* | 4/2018 | Kataoka ............... G06F 16/31 |
| 2019/0027112 | A1 | 1/2019 | Hsu |

FOREIGN PATENT DOCUMENTS

| | | |
|---|---|---|
| CN | 105393282 A | 3/2016 |
| CN | 106021421 A | 10/2016 |
| CN | 107402928 A | 11/2017 |
| CN | 108196920 A | 6/2018 |
| JP | 2016-224942 A | 12/2016 |
| WO | WO 2018/103218 A1 | 6/2018 |

OTHER PUBLICATIONS

English Language Translation of the International Search Report for priority application No. PCT/CN2020/084502 dated Jul. 17, 2020, 2p.
Concise Explanation of Relevance for International Written Opinion for priority application No. PCT/CN2020/084502.
Office Action for corresponding Japanese application No. 2021-531977 dated Aug. 12, 2022, 3p, in Japanese language.
English language translation of Office Action for corresponding Japanese application No. 2021-531977 dated Aug. 12, 2022, 4p.
Office Action for corresponding Chinese application No. 201910370800.5 dated Apr. 29, 2023, 5p, in Chinese language.
Search Report for corresponding Chinese application No. 201910370800.5 dated Apr. 21, 2023, 4p, in Chinese language.
Concise Explanation of Relevancy for C11, C12, C16.
Wann, Changxuan et al., "Indexing XML Data Based on Region Coding for Efficient Processing of Structural Joins", *Chinese Journal of Computers*, vol. 28, No. 1, Jan. 12, 2005, 15p, CN, with English Abstract.
Wang, Kecheng et al., "Design and Implementation of SVG Rendering Engine", *Computer Engineering and Design*, vol. 29, Issue 13, Jul. 16, 2008, 4p, CN, with English Abstract.
Wu, Qingyang et al., "Performance measurement design for the first screen of a web page based on full rendering", *Software Development, China Academic Journal Publishing House*, Issue 16, pp. 42-44, Aug. 15, 2018, CN.

\* cited by examiner

FIG. 4

ELEMENT RENDERING METHOD AND APPARATUS, COMPUTER READABLE STORAGE MEDIUM, AND COMPUTER DEVICE

RELATED APPLICATION

This application is a continuation of PCT Application No. PCT/CN2020/084502, entitled "ELEMENT RENDERING METHOD AND APPARATUS, COMPUTER READABLE STORAGE MEDIUM, AND COMPUTER DEVICE" and filed on Apr. 13, 2020, which claims priority to Chinese Patent Application No. 201910370800.5, entitled "ELEMENT RENDERING METHOD AND APPARATUS, STORAGE MEDIUM, AND COMPUTER DEVICE" and filed on May 6, 2019. The above applications are incorporated herein by reference in their entireties.

TECHNICAL FIELD

This application relates to the technical field of image processing, and in particular, to an element rendering method and apparatus, a computer-readable storage medium, and a computer device.

BACKGROUND

With the development of computer technology, there are more and more applications that can run on computer devices, such as browser applications or game applications. Applications such as browser applications or game applications often need to draw elements through Open Graphics Library (OpenGL) for providing corresponding functions.

At present, taking a to-be-drawn element as a character as an example, a font parser such as freetype (a portable font parser) can usually be integrated in the application to achieve drawing and rendering of any characters. However, integrating a font parser in an application may increase the volume of the application. To prevent the volume from increasing, some solutions use an interface provided by a terminal system to generate a texture map containing a preset character, and then use this texture map for rendering to complete the drawing of the preset character.

SUMMARY

On this basis, an element rendering method and apparatus, a computer-readable storage medium, and a computer device are provided for improving the flexibility of character drawing.

An element rendering method to be performed by a computer device, including:
acquiring at least one to-be-rendered element and at least one corresponding target display position;
searching a locally stored element bitmap for the at least one to-be-rendered element in sequence to obtain a search result;
determining at least one an arrangement position of the at least one to-be-rendered element in the element bitmap according to the search result; and
after determining the at least one arrangement position of the at least one to-be-rendered element in the element bitmap, initiating rendering and displaying the at least one to-be-rendered element at at least one corresponding target display position based on the element bitmap and the arrangement position of the at least one to-be-rendered element in the element bitmap.

An element rendering apparatus, including:
an acquiring module, configured to acquire at least one to-be-rendered element and at least one corresponding target display position;
a search module, configured to search a locally stored element bitmap for the at least one to-be-rendered element in sequence to obtain a search result;
a determining module, configured to determine at least one arrangement position of the at least one to-be-rendered element in the element bitmap according to the search result when the to-be-rendered element is found from the element bitmap; and
a initiating module, configured to initiate rendering and displaying the at least one to-be-rendered element at one corresponding target display position based on the element bitmap and the at least one arrangement position of the at least one to-be-rendered element in the element bitmap after determining the at least one arrangement position of the at least one to-be-rendered element in the element bitmap.

A non-transitory computer-readable storage medium having at least one computer program stored therein, the at least one computer program, when executed by at least one processor, causing the at least one processor to perform the following steps:
acquiring at least one to-be-rendered element and at least one corresponding target display position;
searching a locally stored element bitmap for the at least one to-be-rendered element in sequence to obtain a search result;
determining at least one an arrangement position of the to-be-rendered element in the element bitmap according to the search result; and
after determining the at least one arrangement position of the at least one to-be-rendered element in the element bitmap, initiating rendering and displaying at least one to-be-rendered element at the at least one corresponding target display position based on the element bitmap of the at least one to-be-rendered element and the arrangement position of the at least one to-be-rendered element in the element bitmap.

A computer device, including at least one memory and at least one processor, the at least one memory storing at least one computer program, and the at least one computer program, when executed by the at least one processor, causing the at least one processor to perform the following steps:
acquiring at least one to-be-rendered element and at least one corresponding target display position;
searching a locally stored element bitmap for the at least one to-be-rendered element to obtain a search result;
determining at least one arrangement position of the at least one to-be-rendered element in the element bitmap according to the search result; and
after determining the at least one arrangement position of the at least one to-be-rendered element in the element bitmap, initiating rendering and displaying the at least one to-be-rendered element at at least one corresponding target display position based on the element bitmap and the at least one arrangement position of the at least one to-be-rendered element in the element bitmap.

According to the element rendering method and apparatus, the computer-readable storage medium, and the computer device, at least one to-be-rendered element and a target display position corresponding to each to-be-rendered element are acquired. A locally stored element bitmap is searched for each to-be-rendered element in sequence, and when a to-be-rendered element is found from the element bitmap, a quick response can be made by directly triggering the rendering display operation through historically drawn elements, which greatly reduces the drawing time of the to-be-rendered element. When a to-be-rendered element is not found from the element bitmap, the to-be-rendered element that is not found is drawn in an empty area of the element bitmap, to update the element bitmap. The rendering display operation is triggered according to the updated element bitmap and the arrangement position of the to-be-rendered element in the element bitmap. Moreover, the drawn elements are stored on the element bitmap, and next time an element already drawn is to be rendered, the element can be directly displayed on the screen. In this way, any elements can be drawn and rendered efficiently, without adding an additional library file or font file, which is flexible and convenient and has high practicability.

BRIEF DESCRIPTION OF THE DRAWINGS

FIG. 4 is a schematic diagram of a result of dense packing of characters in an element bitmap according to an embodiment.

DESCRIPTION OF EMBODIMENTS

To make the objectives, technical solutions, and advantages of this application clearer, the following further describes this application in detail with reference to the accompanying drawings and the embodiments. It is to be understood that the specific embodiments described herein are merely used to explain this application but are not intended to limit this application.

Figure 1:
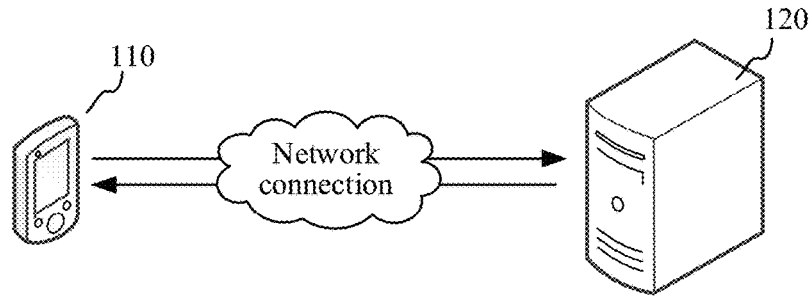
FIG. 1 is a diagram of an application environment of an element rendering method according to an embodiment.

FIG. 1 is a diagram of an application environment of an element rendering method according to an embodiment. With reference to FIG. 1, the element rendering method is applied to an element rendering system. The element rendering system includes a terminal 110 and a server 120. The terminal 110 and the server 120 are connected by a network. The terminal 110 may be specifically desktop terminals or mobile terminals, and the mobile terminal may be specifically at least one of a mobile phone, a tablet computer, a notebook computer, and the like. The server 120 may be implemented by using an independent server or a server cluster that includes a plurality of servers. Both the terminal 110 and the server 120 may be used independently to perform the element rendering method provided in the embodiments of this application. Both the terminal 110 and the server 120 may be alternatively used in cooperation to perform the element rendering method provided in the embodiments of this application.

Figure 2:
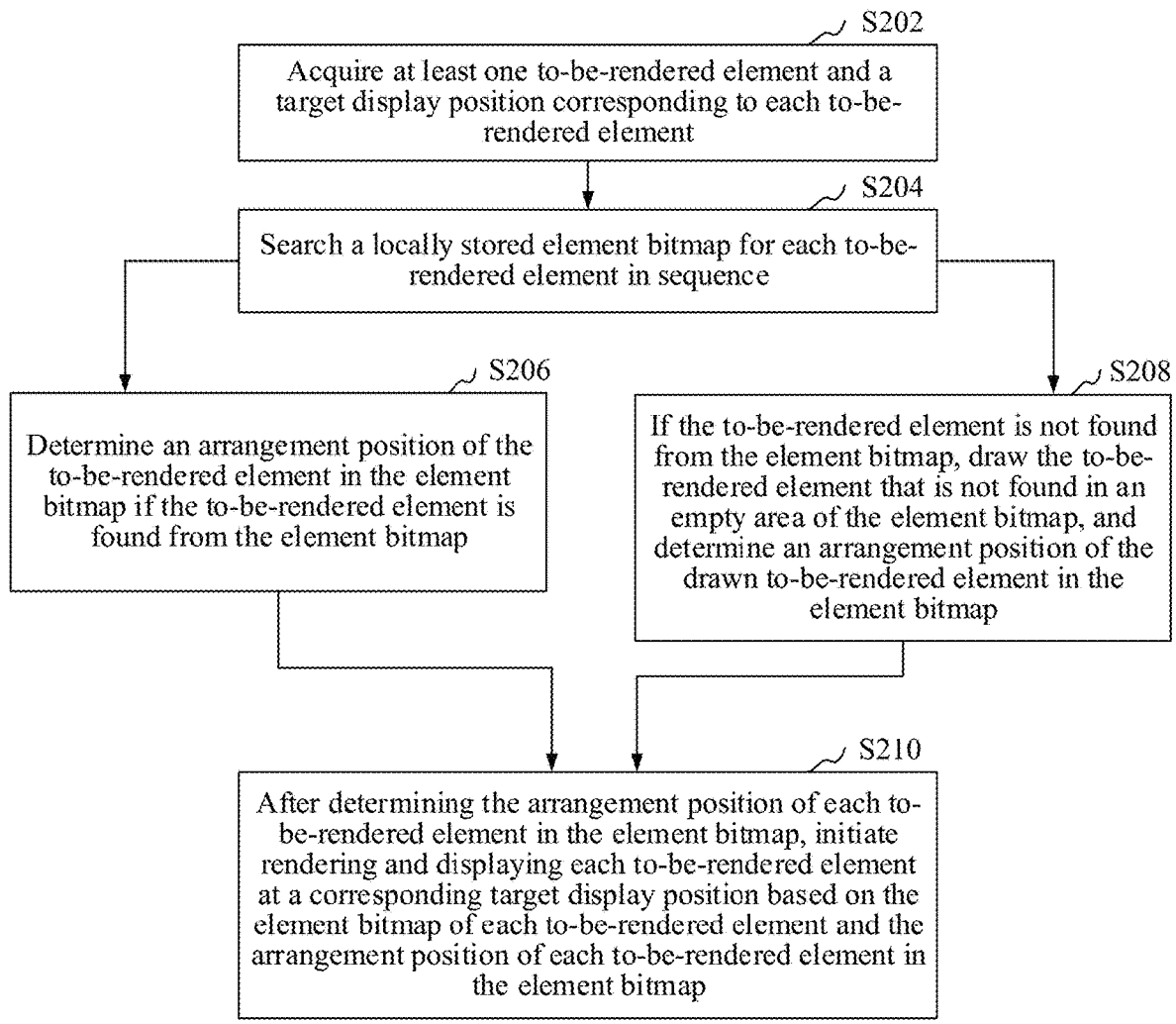
FIG. 2 is a schematic flowchart of an element rendering method according to an embodiment.
Figure 3:
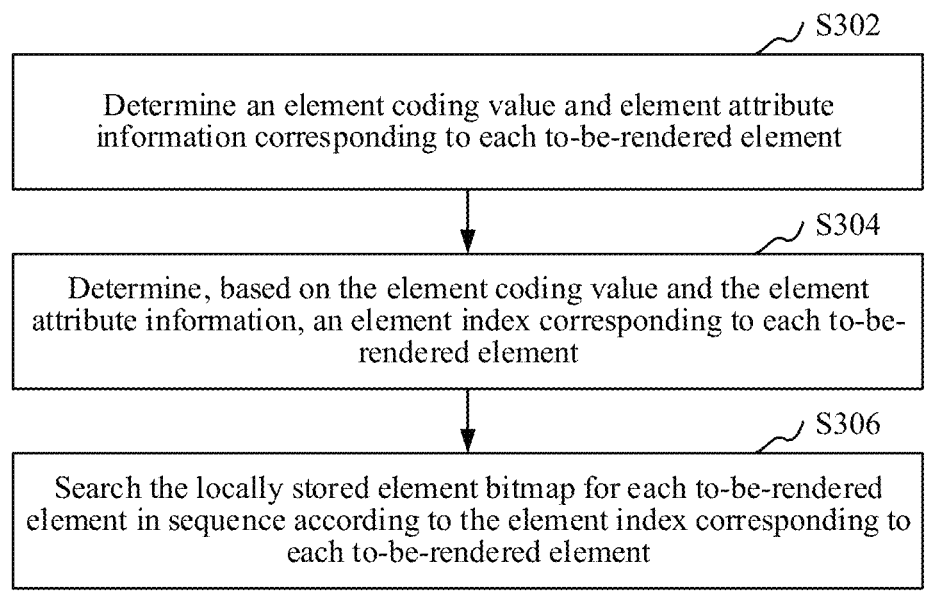
FIG. 3 is a schematic flowchart of steps of searching a locally stored element bitmap for each to-be-rendered element in sequence according to an embodiment.

As shown in FIG. 2, in an embodiment, an element rendering method is provided. This embodiment is mainly described by using an example that the method is applied to a computer device. The computer device may specifically be the terminal 110 or the server 120 in FIG. 1. Referring to FIG. 2, the element rendering method specifically includes the following steps:

S202: A computer device acquires at least one to-be-rendered element and a target display position corresponding to each to-be-rendered element.

The to-be-rendered element is a visual element to be rendered and displayed, and specifically may be at least one of a to-be-rendered character and a to-be-rendered graphic symbol, and the character may be a text, a symbol, or the like. The target display position is a display position where the to-be-rendered element will be rendered and displayed on a display interface, that is, the display position of the to-be-rendered element on the display interface, and specifically may be a specific position or relative position of the to-be-rendered element in the display interface, etc. The target display position can be represented by coordinates, for example, coordinates of an element in the display interface.

If the computer device is a terminal, its display interface may refer to a display interface on the current terminal or a display interface on another terminal. If the computer device is a server, its display interface may refer to a display interface of the server, or may refer to a display interface on another device, which is not limited in the embodiments of this application.

Specifically, the computer device can analyze at least one to-be-rendered element and the target display position corresponding to each to-be-rendered element from a rendering request if the rendering request is detected. The target display position corresponding to the to-be-rendered element may be a preset fixed position, or a position calculated according to a preset algorithm. It can be understood that if the element rendering method is executed by the terminal, the terminal may detect the rendering request triggered by the user; if the element rendering method is executed by the server, the server may receive the rendering request sent by the terminal.

In an embodiment, step S202 specifically includes: the computer device displays a display interface, determines an input position corresponding to each to-be-rendered element if at least one inputted to-be-rendered element is detected in the display interface, and determines, based on the input position, the target display position corresponding to each to-be-rendered element. This process can be understood as determining which elements to render to which target display positions based on the elements inputted by a developer and the input positions thereof.

In an embodiment, the element rendering method is executed by a terminal, and the terminal displays a display interface, and a plurality of input controls for inputting characters and/or graphic symbols are displayed on the display interface. The user may input an element that he/she wants to display through the input control. If the terminal detects the inputted to-be-rendered element in the display interface, the input control corresponding to each to-be-rendered element is determined, and the input position corresponding to each to-be-rendered element is determined based on the position of each input control.

Furthermore, the terminal may determine the corresponding target display position according to the preset correspondence rule and the corresponding input position of each to-be-rendered element. The preset correspondence rule may specifically be a preset correspondence between the input position and the target display position, and different input positions may correspond to the same preset correspondence rule, or may correspond to different preset correspondence rules.

Different input positions may correspond to the same preset correspondence rules. For example, the terminal may preset the coordinate information of the target display position to be the same as the coordinate information of the input position, or have a certain correspondence. For example, the coordinate information of the input position may be linearly changed to calculate the coordinate information of the target display position. Different input positions correspond to different preset correspondence rules. For example, a to-be-rendered element corresponding to an input position 1 is displayed at a position A around the preset image, that is, the target display position corresponding to the to-be-rendered element is dynamically changing, and is a relative position corresponding to the preset image. A to-be-rendered element corresponding to an input position 2 is displayed at a preset position B of a display screen, and so on.

In an embodiment, the terminal may preset a calculation mode of the target display position corresponding to each different input position. Once the terminal determines the input position of the to-be-rendered element, the target display position may be calculated according to the preset calculation mode.

In an embodiment, if the number of to-be-rendered elements is more than one, the to-be-rendered elements may be divided into at least one group according to a proximity relationship of the input positions of the to-be-rendered elements. For example, the to-be-rendered elements whose input positions are adjacent to each other are divided into the same group, the target display positions of the to-be-rendered elements in the same group are adjacent to each other. In this case, the target display position corresponding to each to-be-rendered element may specifically be a target display position corresponding to each group of to-be-rendered elements. The target display position corresponding to a certain group of to-be-rendered elements may specifically be the target display position of an initial to-be-rendered element in the group of to-be-rendered elements.

For example, if the to-be-rendered element is a user name, the user name is, for example, "ZXC". It can be understood that the three characters in "ZXC" are necessarily adjacent when inputted into the display interface, so "Z", "X" and "C" can be regarded as a group of elements, and the target display position corresponding to the group of elements can be a target display position corresponding to "Z".

In an embodiment, the terminal may generate a rendering request according to the inputted to-be-rendered element and the determined corresponding target display position. The element rendering method is triggered locally through the rendering request, or the rendering request is sent to the server to trigger the element rendering method.

In the embodiment above, the target display position corresponding to each to-be-rendered element is determined according to the input position corresponding to each to-be-rendered element, and different elements may be rendered and displayed in different positions, which is convenient and flexible.

S204: The computer device searches a locally stored element bitmap for each to-be-rendered element in sequence.

The element bitmap is a bitmap image, and may also be called a dot matrix image or a drawing image. The computer device may draw various elements on the element bitmap. Specifically, the computer device can store the element bitmap in a local storage medium, such as a local cache. If a rendering request is acquired, the elements existing in the locally stored element bitmap may be traversed to search the locally stored element bitmap for each to-be-rendered element.

The element bitmap may include pre-drawn elements, and the element bitmap may be pre-generated and stored on the computer device, or may be updated based on the rendering process. The element has a certain arrangement position in the element bitmap, and the arrangement position may be determined based on the element index. If the computer device finds the to-be-rendered element in the element bitmap, the corresponding arrangement position and other information may be determined through the element index of the to-be-rendered element, so as to quickly find the element in the element bitmap.

In an embodiment, step S204, i.e., the step of searching a locally stored element bitmap for each to-be-rendered element in sequence specifically includes the following steps:

S302: The computer device determines an element coding value and element attribute information corresponding to each to-be-rendered element.

The element coding value is a coding value obtained by coding the to-be-rendered element, and is used for standardizing the to-be-rendered element. For example, the computer device may perform 8-bit Unicode Transformation Format (UTF-8, which can be used for encoding various characters) encoding processing on the to-be-rendered element to obtain a corresponding element coding value. The element attribute information is information indicating an attribute of the to-be-rendered element. If the to-be-rendered element is a character, the corresponding element attribute information may, for example, specifically be the font size of the character, the font, whether the character is an outline font, whether the character is bold, whether the character is italic, etc. Likewise, if the to-be-rendered element is a graphic symbol, the corresponding element attribute information may, for example, specifically be the graphic number of the graphic symbol, whether the graphic symbol is italic, etc., where the graphic number of the graphic symbol is used for indicating the size of the graphic symbol.

Specifically, the computer device acquires a rendering request, the rendering request carrying the to-be-rendered element and the element attribute information of the to-be-rendered element. The computer device may code the to-be-rendered element to obtain the element coding value. The coding mode for coding the to-be-rendered element can be UTF-8, American Standard Code for Information Interchange (ASCII), or Chinese Internal Code Specification (GBK), and other coding modes, which is not limited in the embodiments of this application.

In an embodiment, if the user triggers the rendering request, the computer device may determine the input position corresponding to the inputted to-be-rendered element. The computer device may determine the element attribute information corresponding to the to-be-rendered element according to the preset correspondence between different input positions and different element attribute information, and the input position corresponding to the input to-be-rendered element.

For example, the computer device can preset the element attribute information corresponding to an input position 1 as: font size 5, regular script, not outline font, bold, and italics, etc., and element attribute information corresponding to an input position 2 as: font size 4, Song typeface, outline font, bold, and not italic, etc. If the input position corresponding to the current to-be-rendered element is an input position 1, the computer device may determine that the element attribute information corresponding to the to-be-rendered element is font size 5, regular script, not outline font, bold, and italics, etc.

S304: The computer device determines, based on the element coding value and the element attribute information, an element index corresponding to each to-be-rendered element.

Specifically, the computer device may splice the element coding value of the to-be-rendered element and each attribute information to obtain spliced information, and perform a Hash operation on the spliced information to obtain an element index of the to-be-rendered element. Alternately, the computer device may combine the element coding value of the to-be-rendered element and each attribute information to obtain the element index of the to-be-rendered element.

It can be understood that the content of the to-be-rendered element may be determined through the element coding value corresponding to the to-be-rendered element, and the display state of the to-be-rendered element may be determined through the element attribute information of the to-be-rendered element. The to-be-rendered element may be uniquely determined based on the element coding value and the element attribute information of the to-be-rendered element, and thus the to-be-rendered element can be indexed using the element index determined according to the element coding value and element attribute information of the to-be-rendered element. It can be understood that different to-be-rendered elements correspond to different element indexes.

S306: The computer device searches the locally stored element bitmap for each to-be-rendered element in sequence according to the element index corresponding to each to-be-rendered element.

In an embodiment, for the elements that are already drawn, the computer device may combine the element coding value corresponding to each element and the corresponding attribute information to generate an element index (also known as a key), and store the element index in association with the element in the element bitmap for search of the element. The computer device may store the element indexes of the drawn elements in a local cache to form an element index set. In another embodiment, for an element that is already drawn, the computer device may splice the element coding value of the element and each attribute information to obtain spliced information, and perform a Hash operation on the spliced information to obtain an element index of the element, and store the element index in association with the element in the element bitmap for search of the element.

In an embodiment, after determining the element index corresponding to each to-be-rendered element, for each to-be-rendered element, the computer device may find whether the element index exists in the element index set stored locally according to the corresponding element index; if the element index exists, it is determined that the to-be-rendered element exists in the locally stored element bitmap; and if the element index does not exist, it is determined that the to-be-rendered element does not exist in the locally stored element bitmap.

In an embodiment, the computer device may traverse each element index in the element index set stored locally to determine whether the element index of the current to-be-rendered element exists in the element index set. If the element index exists, it is determined that the to-be-rendered element exists in the locally stored element bitmap; if the element index does not exist, it is determined that the to-be-rendered element does not exist in the locally stored element bitmap.

In an embodiment, the computer device may store the element index and the corresponding arrangement position of the element that is drawn in the element bitmap in association with each other, as well as the element shape information and element spacing information of the drawn element. If the computer device finds the to-be-rendered element in the element bitmap, information such as the corresponding arrangement position, element shape information, element spacing information may be determined through the element index of the to-be-rendered element, so as to achieve rapid on-screen operation through the determined information.

In the embodiment, the element index corresponding to each to-be-rendered element is determined through the element coding value and the element attribute information corresponding to each to-be-rendered element. According to the element index, each to-be-rendered element can be quickly and accurately found from the locally stored element bitmap.

S206: The computer device determines an arrangement position of the to-be-rendered element in the element bitmap if the to-be-rendered element is found from the element bitmap.

Specifically, when the computer device draws an element in the element bitmap, the arrangement position corresponding to the element is stored in association with the element for subsequent use. If the computer device finds the to-be-rendered element from the element bitmap, it can be considered that the to-be-rendered element is a historically drawn element. Therefore, the computer device locally stores the arrangement position corresponding to the to-be-rendered element, which the computer device can directly obtain.

In an embodiment, the computer device may store the historically drawn element in the element bitmap and analyze the arrangement position of the element in the element bitmap for subsequent use. In this way, in response to the same rendering request next time, the arrangement position of the to-be-rendered element may be quickly returned, so that the computer device may perform the on-screen operation through the previously drawn element. The on-screen operation can also be understood as a rendering display operation.

In a specific embodiment, the computer device may store the historically drawn element in an element bitmap, and store the element shape information, the element spacing information, and the arrangement position, etc. of the element in association with the element. The element shape information is information indicating the shape of the element, such as the length and width of the element, or the area of the element. If the element is a character, the element shape information may, for example, specifically be the length and width of a rectangle where the character is located. The element spacing information is spacing information between the display positions of the to-be-rendered element and an adjacent to-be-rendered element, and the element spacing information corresponding to each to-be-rendered element may determine the adjacency when a plurality of to-be-rendered elements are displayed adjacently in sequence. If the computer device receives a rendering request, the computer device can find out whether there is a current to-be-rendered element in the historically recorded element bitmap. If the current to-be-rendered element is found, the computer device can directly call the associated element shape information, element spacing information and arrangement position, etc., and the to-be-rendered element is displayed on the screen based on the called information.

S208: The computer device draws the to-be-rendered element that is not found in an empty area of the element bitmap, and determines an arrangement position of the drawn to-be-rendered element in the element bitmap if that the to-be-rendered element is not found from the element bitmap.

The empty area, which may also be called a blank area, refers to the space area where no element is drawn in the element bitmap. Specifically, if the computer device does not find the to-be-rendered element from the element bitmap, it can be considered that the to-be-rendered element does not appear in the previous rendering operation, so it is necessary to draw the to-be-rendered element on the element bitmap, to perform the subsequent rendering display operation.

In an embodiment, the computer device may calculate the size of the space required to draw the to-be-rendered element according to the attribute information of the to-be-rendered element, and divide the empty area of the element bitmap into an area of the corresponding space size, and then the to-be-rendered element that is not found is drawn in the divided area. The computer device may use the position of the area allocated for the to-be-rendered element that is not found as the arrangement position of the to-be-rendered element in the element bitmap.

In an embodiment, after step S208, the element rendering method further includes a step of constructing an element index. This step specific includes: determining an element coding value and element attribute information corresponding to the to-be-rendered element in the element bitmap; constructing, based on the determined element coding value and element attribute information, an element index; and storing the constructed element index and the corresponding arrangement position of the to-be-rendered element in the element bitmap in association with each other.

Specifically, when the computer device draws the to-be-rendered element that is not found in the element bitmap, the computer device may record and analyze the drawn element. The computer device may determine the element coding value and the element attribute information corresponding to the to-be-rendered element drawn in the element bitmap, and combine the element coding value corresponding to the to-be-rendered element drawn in the element bitmap and the corresponding element attribute information, to generate an element index (also called a key), and store the constructed element index and the corresponding arrangement position of the to-be-rendered element in the element bitmap in association with each other.

In an embodiment, the computer device may splice the element coding value and each attribute information to obtain spliced information, and perform a Hash operation on the spliced information to obtain the element index corresponding to the to-be-rendered element drawn in the element bitmap.

In an embodiment, the computer device may store the element index and the corresponding arrangement position of the element that is drawn in the element bitmap, as well as the element shape information and element spacing information of the drawn element in association with each other. If the computer device finds the to-be-rendered element in the element bitmap, information such as the corresponding arrangement position, the element shape information, the element spacing information may be determined through the element index of the to-be-rendered element, so as to achieve rapid on-screen operation through the determined information.

In an embodiment, for an element that is drawn in the element bitmap by the computer device, if the computer device acquires a rendering request for the element (that is, a next to-be-rendered element) next time, the computer device can quickly find the to-be-rendered element from the element bitmap based on the element index, and quickly return information such as the arrangement position, the element shape information and the element spacing information of the to-be-rendered element in the element bitmap, so as to use the previously drawn element for the rendering operation.

In the embodiments above, the element index corresponding to the drawn to-be-rendered element and the arrangement position of the to-be-rendered element in the element bitmap are stored in association with each other, and the stored elements can be accumulated in the element bitmap continuously, and next time an element already drawn is to be rendered, the element can be directly displayed on the screen, thereby the element rendering efficiency is greatly improved.

S210: After determining the arrangement position of each to-be-rendered element in the element bitmap, the computer device triggers to render and display each to-be-rendered element at a corresponding target display position based on the element bitmap of each to-be-rendered element and the arrangement position of each to-be-rendered element in the element bitmap.

Rendering display is a process of processing a pixel value of a to-be-rendered object to display the content of the to-be-rendered object on the display interface. Specifically, the computer device may trigger to render and display the to-be-rendered object at the corresponding target position based on the pixel value of each pixel of the element bitmap in the corresponding arrangement position. The pixel value of the pixel may specifically be an ARGB (alpha transparency, red, green, blue) value of the pixel, or a gray value of the pixel.

It can be understood that when the element rendering method is executed by a terminal, after determining the arrangement position of each to-be-rendered element in the element bitmap, the terminal is triggered to render and display each to-be-rendered element at a corresponding target display position based on the element bitmap of each to-be-rendered element and the arrangement position of each to-be-rendered element in the element bitmap. That is, the terminal may trigger to render and display the to-be-rendered object at the corresponding target position directly based on the pixel value of each pixel of the element bitmap in the corresponding arrangement position. When the element rendering method is executed by a server, after determining the arrangement position of each to-be-rendered element in the element bitmap, the server may transmit information including the element bitmap of each to-be-rendered element and the arrangement position of each to-be-rendered element in the element bitmap to the terminal to trigger the terminal to render and display each to-be-rendered element at the corresponding target display position based on the element bitmap including each to-be-rendered element and the arrangement position of each to-be-rendered element in the element bitmap.

In an embodiment, in order to ensure the reuse rate of the element in the element bitmap if the computer device draws the to-be-rendered element on the element bitmap, an RGB value of a valid pixel corresponding to the to-be-rendered element in the drawing area of the element bitmap can be set to a gray value, and a pixel value of an invalid pixel in the drawing area is a preset pixel value, such as 255 (display white), to display the to-be-rendered element. Alternatively, the computer device may also set the pixel value of the valid pixel corresponding to the to-be-rendered element in the drawing area of the element bitmap to a first preset value, such as 0, and the pixel value of the invalid pixel in the drawing area is a second preset value, such as 255. In this way, when the to-be-rendered elements only with different colors are drawn on the element bitmap, the same to-be-rendered element may be shared, which can greatly improve the reuse rate of the elements drawn in the element bitmap. When the computer device renders and displays, a pixel value of a color image to be overlaid and rendered may be determined based on the target color of different to-be-rendered elements, and the color image and the element bitmap are overlaid to render, so that the to-be-rendered element may display the target color at the target display position.

In an embodiment, the target colors of different to-be-rendered elements are different, so the color images corresponding to the different to-be-rendered elements are also different. For each to-be-rendered element, the computer device may perform overlay rendering based on the element bitmap, the corresponding arrangement position of the to-be-rendered element, and the corresponding color image, so as to display the to-be-rendered element of a target color at the target display position.

The element rendering method includes acquiring at least one to-be-rendered element and a target display position corresponding to each to-be-rendered element. A locally stored element bitmap is searched for each to-be-rendered element in sequence, and if a to-be-rendered element is found from the element bitmap, a quick response can be made by directly triggering the rendering display operation through historically drawn elements, which greatly reduces the drawing time of the to-be-rendered element. If a to-be-rendered element is not found from the element bitmap, the to-be-rendered element that is not found is drawn in an empty area of the element bitmap, to update the element bitmap. The rendering display operation is triggered according to the updated element bitmap and the arrangement position of the to-be-rendered element in the element bitmap. Moreover, the drawn elements are stored on the element bitmap, and next time an element already drawn is to be rendered, the element can be directly displayed on the screen. In this way, any elements can be drawn and rendered efficiently, without adding an additional library file or font file, which is flexible and convenient and has high practicability.

In an embodiment, step S208, i.e., the step of drawing the to-be-rendered element that is not found in an empty area of the element bitmap, and determining an arrangement position of the drawn to-be-rendered element in the element bitmap if the to-be-rendered element is not found from the element bitmap may specifically include the following steps: if the to-be-rendered element is not found from the element bitmap, acquiring element shape information corresponding to the to-be-rendered element that is not found; allocating a drawing area in the empty area of the element bitmap for the to-be-rendered element that is not found based on the element shape information; drawing the to-be-rendered element that is not found in the allocated drawing area in the element bitmap to update the element bitmap; and determining an arrangement position of the drawn to-be-rendered element in the updated element bitmap based on the drawing area.

The element shape information is information indicating the size of the element shape, and specifically may be length and width information of the element. The length and width information of the element may be represented by the length and width information of a rectangle where the element is located. The rectangle where the element is located refers to the smallest rectangle that can cover the element in parallel. The length of the rectangle is the same as the height of the element, and the width of the rectangle is the same as the width of the element.

In an embodiment, the computer device may determine the element shape information corresponding to the to-be-rendered element based on the element attribute information of the to-be-rendered element that is not found. The computer device may allocate a drawing area to the to-be-rendered element that is not found in the empty area of the element bitmap based on the element shape information, and draw the to-be-rendered element that is not found in the allocated drawing area of the element bitmap, to update the element bitmap. For example, for a computer device of the Android system, the computer device may draw the to-be-rendered element to android.view.Bitmap for temporary storage.

In an embodiment, the computer device may determine the arrangement position of the to-be-rendered element in the element bitmap based on the drawing area allocated for the to-be-rendered element that is not found. For example, the computer device may directly take the drawing area allocated for the to-be-rendered element that is not found as the arrangement position of the to-be-rendered element in the element bitmap; alternatively, the computer device can also take coordinate information of the upper left corner and the lower right corner of the drawing area as coordinate information of the arrangement position of the to-be-rendered element in the element bitmap; alternatively, the computer device can also take coordinate information of a center point of the drawing area as the coordinate information of the arrangement position of the to-be-rendered element in the element bitmap.

In the embodiment above, a drawing area is allocated to the to-be-rendered element that is not found based on the element shape information corresponding to the to-be-rendered element, and the to-be-rendered element that is not found is drawn in the allocated drawing area in the element bitmap, so that the to-be-rendered element can be accurately drawn in the empty area of the element bitmap.

In an embodiment, the step of acquiring element shape information corresponding to the to-be-rendered element that is not found if the to-be-rendered element cannot be found from the element bitmap specifically includes: if the to-be-rendered element is not found from the element bitmap, acquiring element boundary measurement information corresponding to the to-be-rendered element that is not found through an element boundary information acquisition interface and an element measurement interface; and correcting the element boundary measurement information according to a preset rule to obtain the element shape information corresponding to the to-be-rendered element that is not found.

The preset rule is a preset calculation mode, and the preset rule may be a rule summed up by the developer based on multiple trials and tests. For example, if the element boundary measurement information includes the element shape information, in order to reduce the influence of the element clipping problem, the preset rule can be set as the following: taking a maximum value in element width values respectively acquired by the element boundary information acquisition interface and the element measurement interface (or the sum of the maximum value and the preset value (such as value 1)) as an actual element width value, and taking a difference between a lower limit value of the element and an upper limit value of the element acquired through the element boundary information acquisition interface as an actual height value of the element, etc.

In an embodiment, if the to-be-rendered element is not found in the element bitmap, the computer device may acquire the element boundary measurement information by calling the element boundary information acquisition interface and the element measurement interface. The element boundary measurement information may specifically include the element shape information and the element spacing information.

In the actual application process, the data acquired through the element boundary information acquisition interface and the element measurement interface is relatively simple. If the data is used directly, the problem of element clipping due to different computer device models may occur, so correcting the acquired element boundary measurement information can be done.

Taking a terminal running the Android system as an example, the Android system does not natively support direct calling of a Typeface interface. If the terminal directly calls android.graphics.Paint.getTextBounds and android.graphics.Paint.measureText interfaces, and reads a return value of the system, there will be some errors to be corrected. Specifically, the maximum value in the element width values respectively acquired through the element boundary information acquisition interface, and the element measurement interface is added with 1 as the actual width value (real_width). The difference between the lower limit value (bounds.descent) of the element and the upper limit value (bounds.ascent) of the element acquired through the element boundary information acquisition interface is used as the actual height value (also known as the actual length value) (real_height) of the element (also called the actual length value) (real_height). If the element is a hollow character, the horizontal font offset (glyph.offset_x) of the element is half of the negative hollow width value (−stroke_width/2); the width value (glyph.width) of the corrected hollow character is the sum of the hollow width value and the actual width value (stroke_width+real_width); the height value (glyph.height) of the corrected hollow character is the actual height value (real_height). If the element is not a hollow character, the horizontal font offset (glyph.offset_x) of the element is 0; the width value (glyph.width) of the corrected character is the actual width value (real_width); the height value (glyph.height) of the corrected character is the actual height value (real_height).

Pseudo codes for implementing this correction process are as follows:

```
RectF bounds=getTextBounds('')
float measure_width=measureText('')
float real_width=max(bounds.width, measure_width)+1
float real_height=bounds.descent−bounds.ascent
glyph.advance_x=real_width
if (stroke) {
    glyph.offset_x=−stroke_width/2f
    glyph.width=stroke_width+real_width
    glyph.height=real_height
} else {
    glyph.offset_x=0
    glyph.width=real_width
    glyph.height=real_height
}
```

In the embodiment above, the element boundary measurement information acquired through the element boundary information acquisition interface and the element measurement interface is corrected through a preset calculation mode, which mitigates the problem of element clipping, and is suitable for different types of computer devices, so that the acquired element shape information is more accurate and effective, which greatly improves the applicability.

In an embodiment, the step of allocating a drawing area in the empty area of the element bitmap for the to-be-rendered element that is not found based on the element shape information includes: allocating a drawing area in the empty area adjacent to elements included in the element bitmap for the to-be-rendered element that is not found based on the element shape information. The step of drawing the to-be-rendered element that is not found in the allocated drawing area in the element bitmap to update the element bitmap specifically includes: drawing the to-be-rendered element that is not found in the allocated drawing area in the element bitmap to update the element bitmap, the elements drawn in the element bitmap being arranged in a dense packing manner.

Specifically, in the actual application process, one factor for ensuring efficient drawing of any element lies is how to reduce the frequency of clearing the element bitmap as much as possible, that is, the historically drawn elements are stored in the element bitmap for as long as possible. On this basis, the computer device can use a dense packing algorithm to allocate a drawing area for the to-be-rendered element that is not found in the empty area adjacent to the elements included in the element bitmap based on the element shape information. The computer device draws the to-be-rendered element that is not found in the allocated drawing area in the element bitmap. The elements drawn in the element bitmap are densely packed. In this way, an element bitmap can store as many elements as possible.

In an embodiment, the dense packing algorithm adopted to allocate the drawing area for the to-be-rendered element may specifically be SkylineBLRectPacking (an arrangement algorithm), and certainly, may also be other dense packing algorithms, which is not limited in the embodiments of this disclosure. The computer device may allocate a cache space occupied by the element bitmap to 1024*1024. Certainly, more or less cache space can also be allocated according to performance parameters of the computer device and the remaining cache space.

Figure 4:
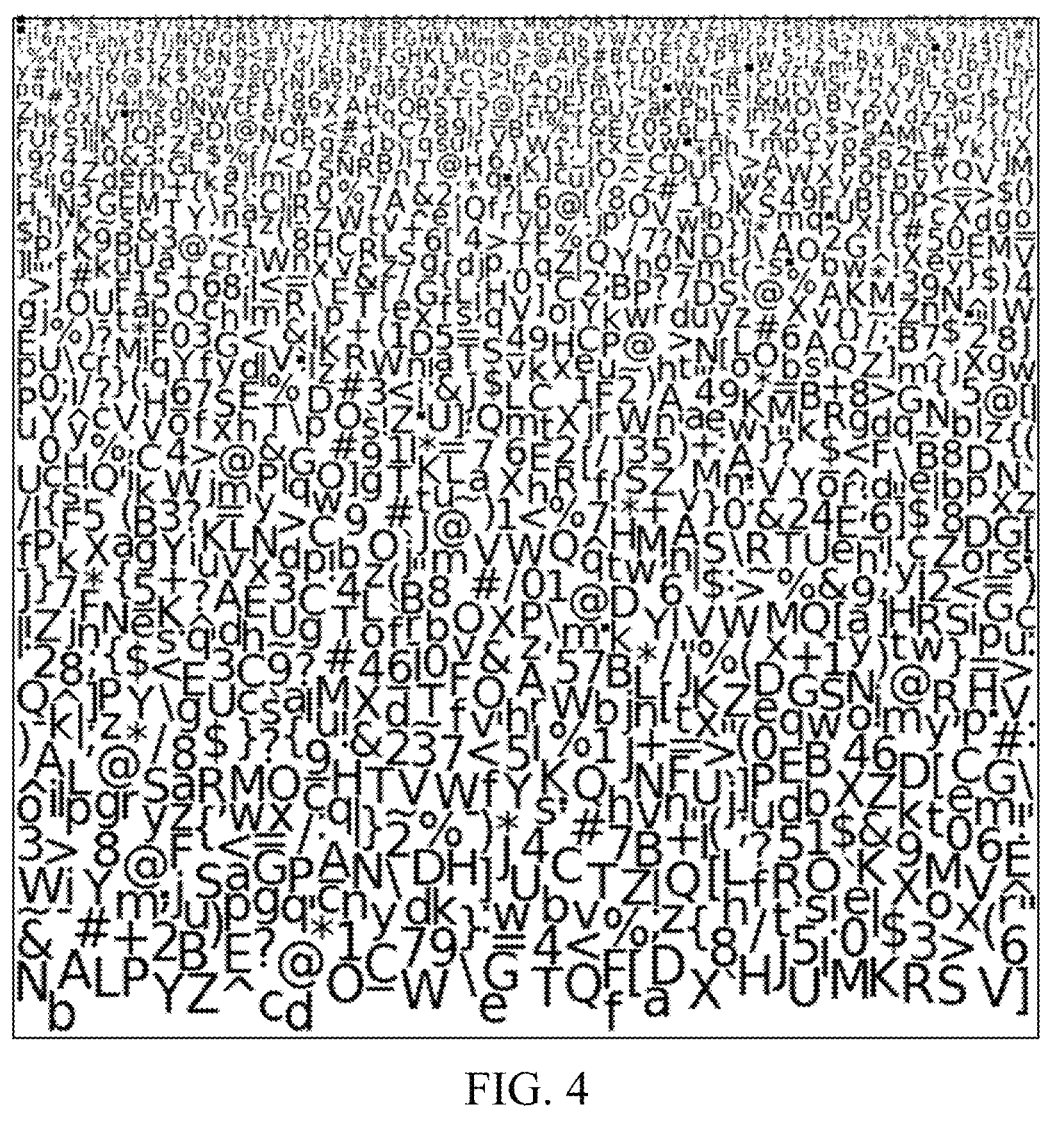

Referring to FIG. 4, FIG. 4 is a schematic diagram of a result of dense packing of characters in an element bitmap according to an embodiment. The cache space of the element bitmap shown in FIG. 4 is 512*512. It can be seen from FIG. 4 that the elements drawn in the element bitmap are arranged closely to save space to the utmost extent. It can be understood that the element texture map obtained through conversion of the element bitmap also presents the effect shown in FIG. 4.

In the embodiment above, the to-be-rendered elements that are not found are drawn densely in the element bitmap, which can save space. As many elements as possible can be drawn in an element bitmap, so that when a rendering request is acquired, the probability of finding the to-be-rendered element from the element bitmap is greatly improved, thereby improving the efficiency of element rendering.

In an embodiment, the step of drawing the to-be-rendered element that is not found in an empty area of the element bitmap, and determining an arrangement position of the drawn to-be-rendered element in the element bitmap when the to-be-rendered element is not found from the element bitmap includes: if the to-be-rendered element is not found from the element bitmap, determining an empty space of the element bitmap; if the empty space is less than or equal to a preset space, clearing the elements included in the element bitmap; and if the empty space is greater than the preset space, executing the operation of drawing the to-be-rendered element that is not found in the empty area of the element bitmap and determining the arrangement position of the drawn to-be-rendered element in the element bitmap.

The empty space is the size of the empty area in the element bitmap, i.e., the cache space that is not used in the element bitmap. The preset space is a preset area size, which can be a preset cache size, or the space size required to draw an element. The developer can set the value of the preset space based on actual experience, where the value of the preset space can also be zero or other values. Specifically, when the computer device does not find the to-be-rendered element from the element bitmap, the empty space of the current element bitmap is determined. If the empty space of the current element bitmap is greater than the preset space, the step of drawing the to-be-rendered element that is not found in the empty area of the element bitmap and determining the arrangement position of the drawn to-be-rendered element in the element bitmap is executed. If the empty space of the current element bitmap is less than or equal to the preset space, it indicates that in this case, the empty space in the element bitmap is not enough to draw the to-be-rendered element, and the elements included in the element bitmap need to be cleared. After the element bitmap is cleared, or some elements in the element bitmap are cleared, the step of drawing the to-be-rendered element that is not found in the empty area of the element bitmap and determining the arrangement position of the drawn to-be-rendered element in the element bitmap is executed again.

In the embodiment above, when the empty space of the element bitmap is insufficient, the element bitmap can be cleared and then the to-be-rendered element can be drawn. Under the condition of limited cache space, it can be ensured that the to-be-rendered element can be drawn successfully.

In an embodiment, the element rendering method further includes the following step: determining element spacing information corresponding to each to-be-rendered element. Step S210, i.e., the step of rendering and displaying each to-be-rendered element at the corresponding target display position based on the element bitmap of each to-be-rendered element and the arrangement position of each to-be-rendered element in the element bitmap after determining the arrangement position of each to-be-rendered element in the element bitmap includes: after determining the arrangement position of each to-be-rendered element in the element bitmap, triggering to render and display each to-be-rendered element at a corresponding target display position based on the element bitmap of each to-be-rendered element and the arrangement position of each to-be-rendered element in the element bitmap as well as the element spacing information corresponding to each to-be-rendered element.

The element spacing information is spacing information between the display positions of the to-be-rendered element and an adjacent to-be-rendered element, and the element spacing information corresponding to each to-be-rendered element may determine the adjacency if a plurality of to-be-rendered elements are displayed adjacently in sequence. If the to-be-rendered element is a character, the element spacing information may specifically include a baseline position, a font advance, and a font offset, etc. If the to-be-rendered element is a graphic symbol, the element spacing information may specifically include a baseline position, a graphic advance, and a graphic offset, etc.

Figure 5:
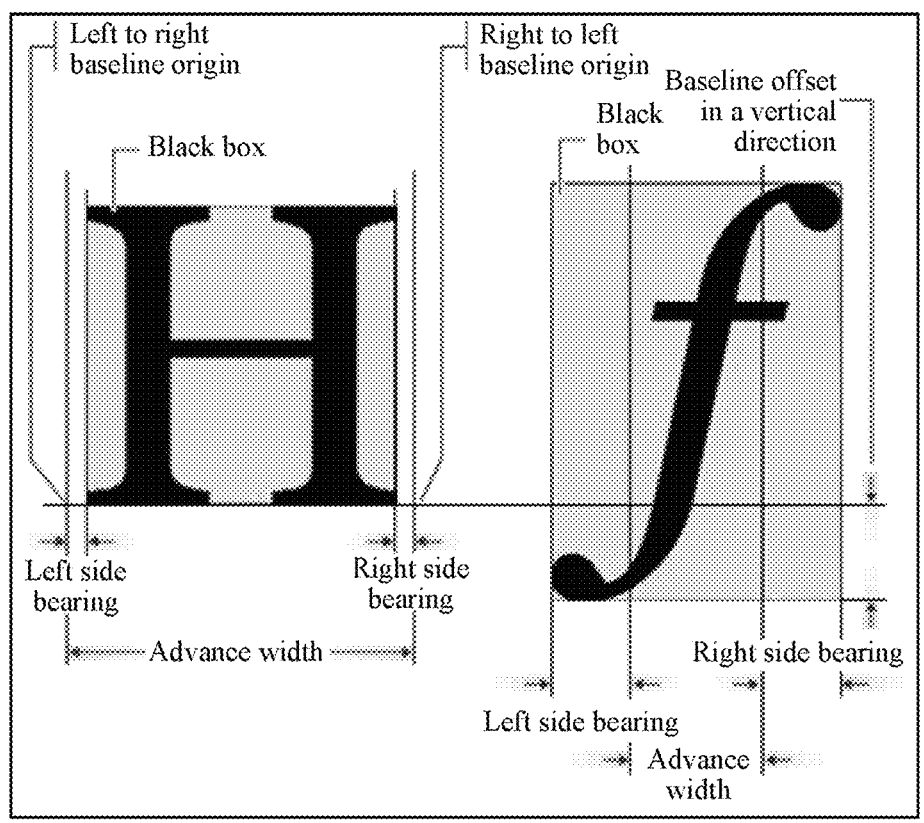
FIG. 5 is a schematic diagram showing element spacing information according to an embodiment.

Referring to FIG. 5, FIG. 5 is a schematic diagram showing element spacing information according to an embodiment. Referring to FIG. 5, character shape information and character spacing information for a single character are shown in FIG. 5. As shown in FIG. 5, for a character "H", a vertical line on the left of the character "H" is a left to right baseline origin, and a vertical line on the right of the character "H" is a right to left baseline origin; the character "H" is drawn in a black box; a distance from the baseline on the left of the character "H" to the border of the left side of the character "H" is a left side bearing, and a distance from the baseline on the right side of the character "H" to the border of the right side of the character "H" is a right side bearing; and a distance from the left baseline to the right baseline of the character "H" is an advance width, also known as an interval width.

For a character "f", the character "f" is drawn in a black box; a left baseline and a right baseline of the character "f" are two vertical lines in the middle of the black box, respectively; a distance from the baseline on the left of the character "f" to the border of the left side of the character "f" is a left side bearing, and a distance from the baseline on the right of the character "f" to the border of the right side of the character "f" is a right side bearing; and a distance from the left baseline to the right baseline of the character "f" is an advance width, also known as an interval width.

It can be understood that if the to-be-rendered element is a character, the element spacing information may specifically include a position of the left baseline, a position of the right baseline, an advance width, and a font offset, etc. in FIG. 4. The font offset may specifically be an offset in the horizontal direction or an offset in the perpendicular direction (also called an offset in the vertical direction).

In an embodiment, when the to-be-rendered element is found from the element bitmap, the computer device may directly search for the element spacing information associated with the element index of the to-be-rendered element. If the to-be-rendered element is not found in the element bitmap, the computer device may determine the corresponding element spacing information based on the element attribute information of the to-be-rendered element.

In an embodiment, the computer device may acquire the element shape information and the element spacing information by calling the element boundary information acquisition interface and the element measurement interface. For example, for a terminal of the Android system, the element shape information and the element spacing information may be acquired by calling an android.graphics.Paint.getTextBounds/android.graphics.Paint.measureText interface.

Furthermore, for a to-be-rendered element that does not originally exist in the element bitmap, the computer device may allocate a drawing area for the to-be-rendered element in the empty area of the element bitmap based on the element shape information and the element spacing information, and draw the to-be-rendered element in the drawing area. Furthermore, the computer device may determine the arrangement position of the to-be-rendered element in the element bitmap based on the drawing area. After determining the arrangement position of each to-be-rendered element in the element bitmap, the computer device renders and displays each to-be-rendered element at the corresponding target display position based on the element bitmap including each to-be-rendered element and the arrangement position of each to-be-rendered element in the element bitmap as well as the element spacing information corresponding to each to-be-rendered element.

In an embodiment, the target display position acquired by the computer device may be a target display position corresponding to an initial to-be-rendered element in a group of to-be-rendered elements, such as the position corresponding to "Z" in "ZXC". Then, the computer device may determine in order the target display position corresponding to each to-be-rendered element in the group of to-be-rendered elements based on a target display position corresponding to the initial to-be-rendered element in the group of to-be-rendered elements and the element spacing information corresponding to each to-be-rendered element, so as to display each to-be-rendered element at the target display position corresponding to each to-be-rendered element. In addition, through the baseline position of each to-be-rendered element, it can be ensured that the to-be-rendered elements in the same row or column are neatly distributed during rendering and display, thereby avoiding a problem of disorderly arrangement.

In the embodiment above, triggering to render and display each to-be-rendered element at a corresponding target display position based on the element bitmap including each to-be-rendered element, the arrangement position of each to-be-rendered element in the element bitmap, and the element spacing information corresponding to each to-be-rendered element can mitigate the problems such as overlapping of displayed elements, excessive element spacing, or uneven baselines of elements, and enhance the accuracy and aesthetics of element display.

In an embodiment, the step of triggering to render and display each to-be-rendered element at the corresponding target display position based on the element bitmap of each to-be-rendered element and the arrangement position of each to-be-rendered element in the element bitmap after determining the arrangement position of each to-be-rendered element in the element bitmap specifically includes: after determining the arrangement position of each to-be-rendered element in the element bitmap, generating an element texture map based on the element bitmap including each to-be-rendered element; and triggering to render and display each to-be-rendered element at the corresponding target display position based on the element texture map and the arrangement position of each to-be-rendered element in the element bitmap.

Specifically, after determining the arrangement position of each to-be-rendered element in the element bitmap, the computer device may convert the element bitmap into an element texture map, and trigger a rendering display operation based on the element texture map.

In an embodiment, the computer device may create a texture object and an n-dimensional array storing texture data, and the computer device may call a glTextImageND function to transfer a pixel value of each pixel in the element bitmap to the texture object and the n-dimensional array, to generate a corresponding element texture map.

In an embodiment, the step of rendering and displaying each to-be-rendered element at the corresponding target display position based on the element texture map and the arrangement position of each to-be-rendered element in the element bitmap specifically includes: calling a graphics rendering interface to render and display each to-be-rendered element at the corresponding target display position based on the element texture map and the arrangement position of each to-be-rendered element in the element bitmap.

In an embodiment, the computer device may call a graphics rendering interface, such as a glDrawArray interface (a graphics rendering interface), to implement the on-screen operation of the to-be-rendered element.

In a specific application scenario, such as a game application scenario, in addition to displaying a game interface preset by the developer, the current display interface also needs to display other elements, such as the user's nickname. The nickname of each user may be different, which is not predictable by the developer, so the game application needs to have the ability to render and display any characters. Since most of the game pictures are rendered and displayed based on an OpenGL interface, the rendering and display of the any character may also be rendered and displayed based on the OpenGL interface, so that the image and the character may be displayed simultaneously.

In an embodiment, the pixel value of each element in the element bitmap makes the to-be-rendered element only present a single color. Correspondingly, each to-be-rendered element in the element texture map generated by the conversion also only presents a single color. In actual applications, different target colors are often displayed in rendering and displaying the to-be-rendered element. In view of the above, the computer device may determine a pixel value of a color image requiring overlay rendering according to the target color of different to-be-rendered elements, and overlay rendering is performed on the color image and the element texture map, so that the to-be-rendered element displays the target color at the target display position.

In the embodiment above, based on the element texture map generated according to the element bitmap including each to-be-rendered element, and the arrangement position of each to-be-rendered element in the element bitmap, each to-be-rendered element can be rendered and displayed at the corresponding target display position quickly and accurately.

In specific usage scenarios, for sub-applications running in a parent application (such as an applet running in the operating environment provided by the application), due to the particularity of its own operating environment, the installation package of the sub-application needs to be as small as possible, and on the premise of ensuring that the installation package of the sub-application is as small as possible, how to ensure that the various functions of the sub-application can be used normally is a problem that needs to be solved urgently. For example, for game applets, how to not add additional library files or font files, but also ensure efficient drawing of "any text" without additionally increasing the volume of any installation package, is a technical problem that needs to be solved. Moreover, by executing the method provided in each embodiment of this disclosure, the applet can draw any text using the OpenGL interface without additionally adding the library files or font files, and at the same time, on this basis, the method provided in this disclosure is also compatible with the drawing ability of image symbols such as emoji. The ability requirements of the applet to run in the parent application and realize the corresponding functions are satisfied, which increases the usability of the applet development.

In a specific embodiment, taking the drawing of characters on the terminal of the Android system as an example, this solution is described in detail. This solution can be implemented by a plurality of software modules, specifically including a master control module, a cache hit module, a glyph drawing module, and a glyph layout module.

Figure 6:
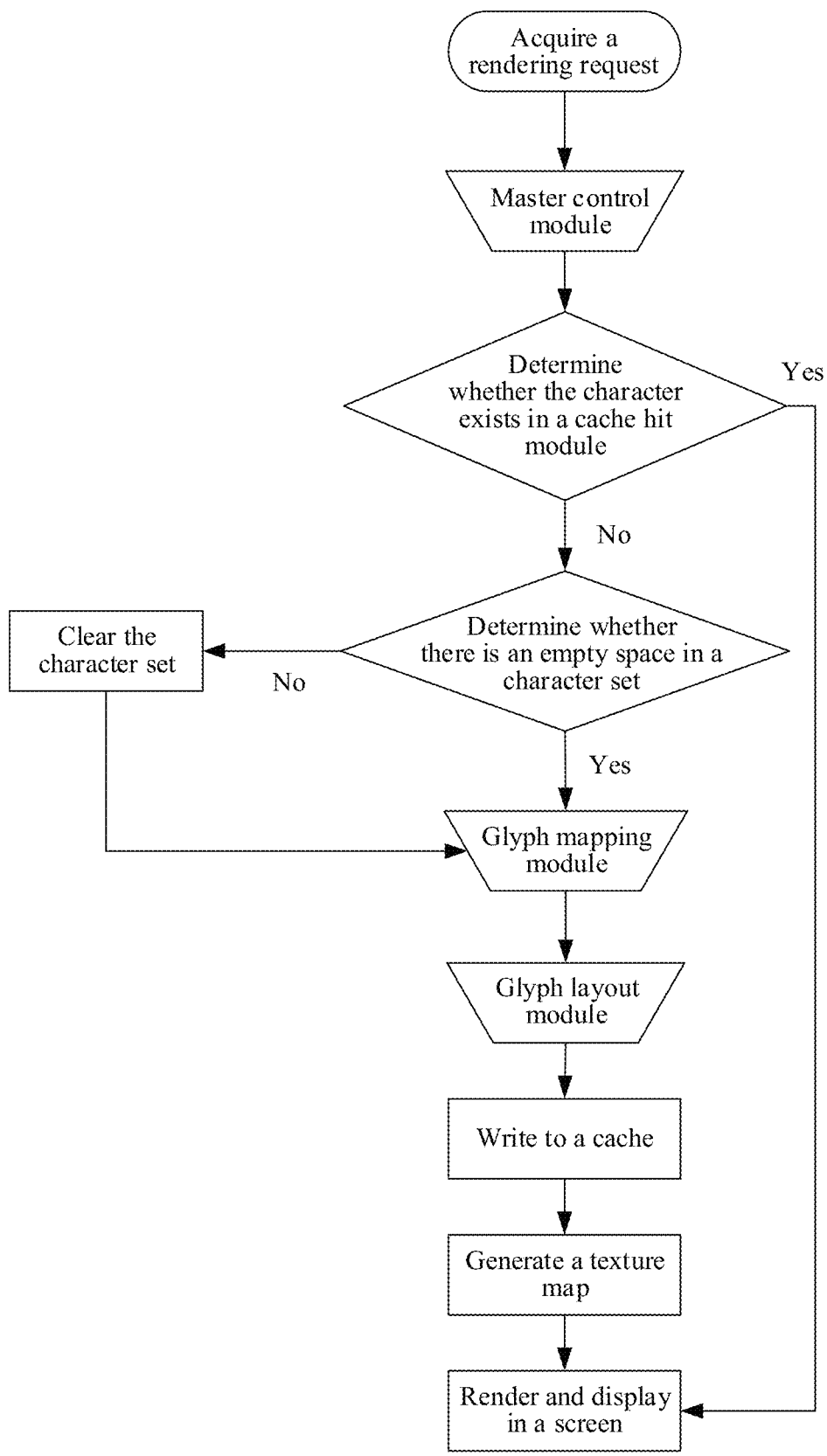
FIG. 6 is a schematic flowchart of an element rendering method according to a specific embodiment.

Referring to FIG. 6, FIG. 6 is a schematic flowchart of an element rendering method according to an embodiment. As shown in FIG. 6, the developer calls a drawing interface to trigger a rendering request, the rendering request being submitted to the master control module for unified processing, and the master control module also has the function of scheduling other modules. The master control module queries whether the character already exists in the cache hit module. If the character exists, the character directly enters the process of drawing on screen. If the character does not exist, the glyph drawing process is started. Whether there is space in a character set in the element bitmap is checked first; if not, the character set is cleared; and if so, glyph drawing is carried out. The glyph drawing process is mainly completed by the glyph drawing module (Glyph module) and the glyph layout module (Atlas module). In the two modules, the glyph drawing module acquires character shape information and character spacing information of the drawn glyph to solve how to draw the glyph; and the glyph layout module resolves the problem of where the glyph is drawn in the element bitmap, and the module needs to ensure that the glyphs are drawn as densely as possible to reduce the frequency of emptying the character set. After the terminal writes the glyph into a cache, an element texture map may be generated based on the element bitmap, and the on-screen operation is carried out through the element texture map.

The functions of the modules are described in detail below: The master control module is a scheduler of each module. In addition, in addition to the coordinated scheduling of each module, the master control module is also responsible for the application and release of resources, the management of OpenGL resources, and execution of OpenGL commands related to glyph drawing, etc.

Cache hit module (Cache module): This module is responsible for recording and analyzing the currently drawn glyphs, and if there is the same drawing request next time, this module can quickly return a result and use the previously drawn glyphs for on-screen operations. In order to ensure the efficiency of the drawing task, this solution may reduce the frequency of clearing the character set as much as possible, so the hit module is cached.

Glyph drawing module (Glyph module): The glyph drawing module acquires specific accurate information of the glyph, including the character shape information and the character spacing information. The glyph drawing module draws the glyph to android.view.Bitmap for temporary storage, and finally the master control module submits the bitmap as texture, and finally displays the bitmap on the screen.

Glyph layout module (Atlas module): Specifically, a SkylineBLRectPacking algorithm can be used for allocating the drawing space for characters, so as to minimize the frequency of clearing the character set as few as possible.

Finally, the densely packed texture map is transferred to an underlying storage together with the specific accurate information of the glyph measured by the glyph module, and finally the glDrawArray interface is used for on-screen.

In a specific embodiment, the element rendering method includes the following steps:

S702: A computer device displays a display interface.

S704: If at least one inputted to-be-rendered element is detected in the display interface, the computer device determines an input position corresponding to each to-be-rendered element.

S706: The computer device determines, based on the input position, a target display position corresponding to each to-be-rendered element.

S708: The computer device determines an element coding value and element attribute information corresponding to each to-be-rendered element.

S710: The computer device determines, based on the element coding value and the element attribute information, an element index corresponding to each to-be-rendered element.

S712: The computer device searches a locally stored element bitmap for each to-be-rendered element in sequence according to the element index corresponding to each to-be-rendered element.

S714: The computer device determines an arrangement position of the to-be-rendered element in the element bitmap and corresponding element spacing information if the to-be-rendered element is found from the element bitmap.

S716: If the to-be-rendered element is not found from the element bitmap, the computer device determines an empty space of the element bitmap.

S718: If the empty space is less than a preset space, the computer device clears the elements included in the element bitmap.

S720: If the empty space is greater than or equal to the preset space, the computer device acquires element boundary measurement information corresponding to the to-be-rendered element that is not found through an element boundary information acquisition interface and an element measurement interface.

S722: The computer device corrects the element boundary measurement information according to a preset rule, to obtain the element shape information corresponding to the to-be-rendered element that is not found, and the element spacing information.

S724: The computer device may allocate a drawing area for the to-be-rendered element that is not found in the empty area adjacent to the elements included in the element bitmap based on the element shape information and the element spacing information.

S726: The computer device draws the to-be-rendered element that is not found in the allocated drawing area in the element bitmap to update the element bitmap, the elements drawn in the element bitmap being arranged closely.

S728: The computer device determines the arrangement position of the drawn to-be-rendered element in the updated element bitmap based on the drawing area.

S730: The computer device determines an element coding value and element attribute information corresponding to the to-be-rendered element drawn in the element bitmap.

S732: The computer device constructs an element index based on the determined element coding value and element attribute information.

S734: The computer device stores the constructed element index and the corresponding arrangement position of the to-be-rendered element in the element bitmap in association with each other.

S736: After determining the arrangement position of each to-be-rendered element in the element bitmap, the computer device generates an element texture map based on the element bitmap including each to-be-rendered element.

S738: The computer device calls a graphics rendering interface to trigger to render and display each to-be-rendered element at the corresponding target display position based on the element texture map and the arrangement position of each to-be-rendered element in the element bitmap according to the element spacing information corresponding to each to-be-rendered element.

Figure 7:
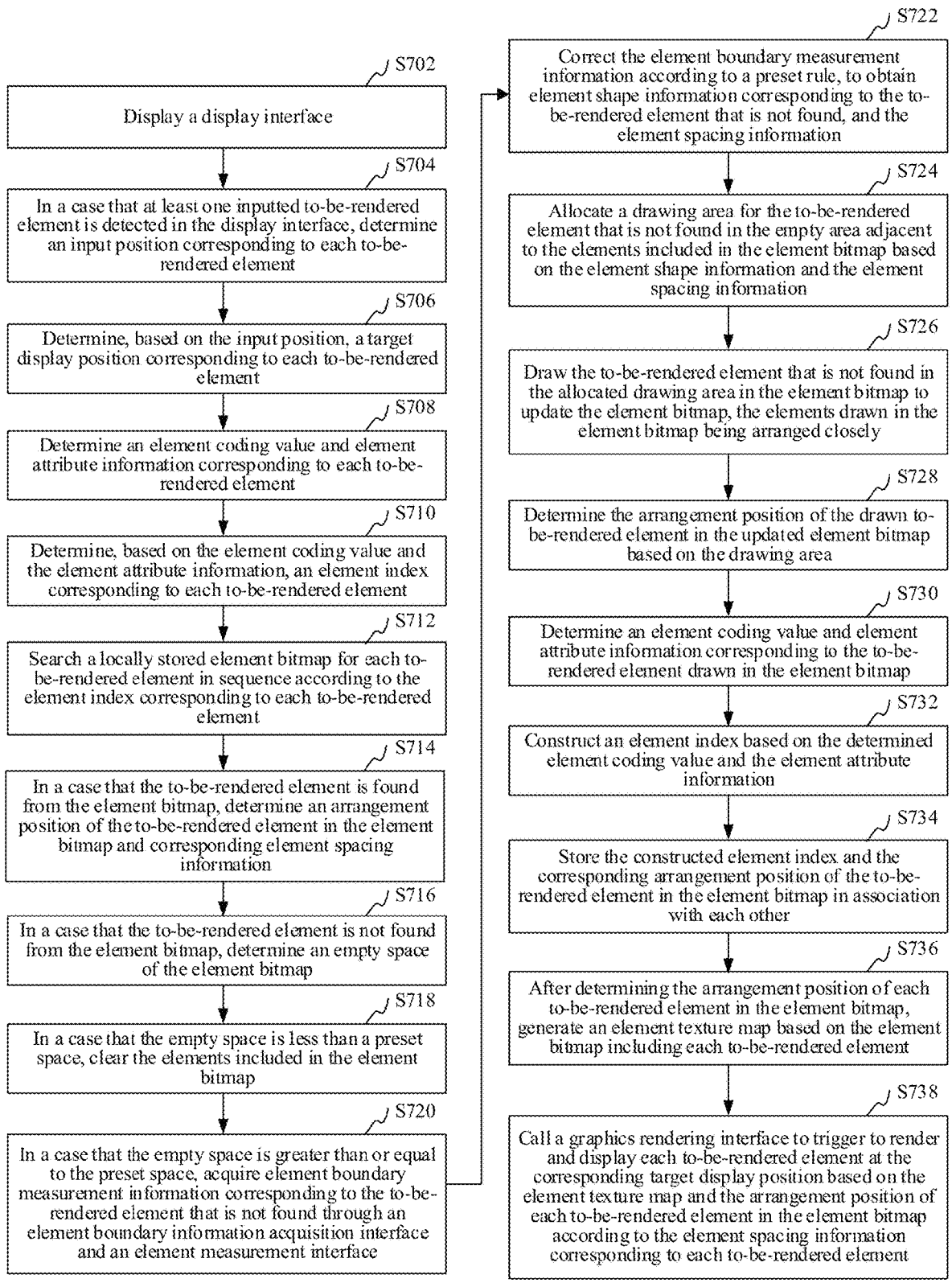
FIG. 7 is a schematic flowchart of an element rendering method according to another specific embodiment.

FIG. 7 is a schematic flowchart of an element rendering method according to an embodiment. It is to be understood that, although each step of the flowchart in FIG. 7 is displayed sequentially according to arrows, the steps are not necessarily performed according to an order indicated by arrows. Unless otherwise explicitly specified in this disclosure, execution of the steps is not strictly limited, and the steps may be performed in other sequences. Furthermore, at least some steps in FIG. 7 may include a plurality of sub-steps or a plurality of stages. The sub-steps or stages are not necessarily performed at the same moment, and may be performed at different moments. The sub-steps or stages are not necessarily performed in order, and may be performed in turn or alternately with other steps or at least some of sub-steps or stages of other steps.

Figure 8:
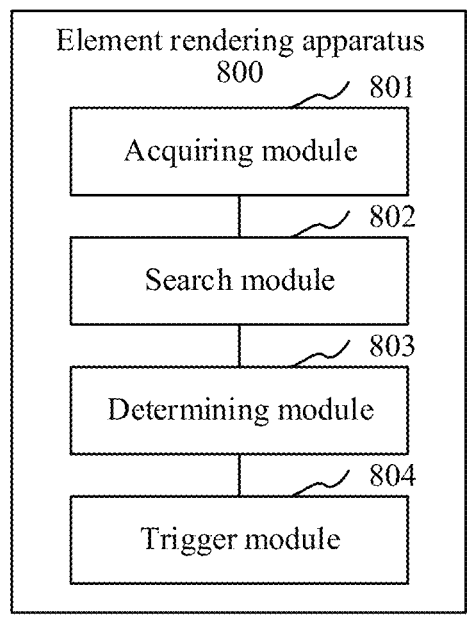
FIG. 8 is a structural block diagram of an element rendering apparatus according to an embodiment.

As shown in FIG. 8, in an embodiment, an element rendering apparatus 800 is provided, including: an acquiring module 801, a search module 802, a determining module 803, and a trigger module 804.

The acquiring module 801 is configured to acquire at least one to-be-rendered element and a target display position corresponding to each to-be-rendered element.

The search module 802 is configured to search a locally stored element bitmap for each to-be-rendered element in sequence.

The determining module 803 is configured to determine an arrangement position of the to-be-rendered element in the element bitmap if the to-be-rendered element is found from the element bitmap.

The determining module 803 is further configured to draw the to-be-rendered element that is not found in an empty area of the element bitmap, and determine an arrangement position of the drawn to-be-rendered element in the element bitmap if the to-be-rendered element is not found from the element bitmap.

The trigger module 804 is configured to trigger to render and display each to-be-rendered element at a corresponding target display position based on the element bitmap of each to-be-rendered element and an arrangement position of each to-be-rendered element in the element bitmap after determining the arrangement position of each to-be-rendered element in the element bitmap.

In an embodiment, the acquiring module 801 is further configured to display a display interface, determine an input position corresponding to each to-be-rendered element if at least one inputted to-be-rendered element is detected in the display interface, and determine, based on the input position, the target display position corresponding to each to-be-rendered element.

In an embodiment, the search module 802 is further configured to determine an element coding value and element attribute information corresponding to each to-be-rendered element, determine, based on the element coding value and the element attribute information, an element index corresponding to each to-be-rendered element, and search the locally stored element bitmap for each to-be-rendered element in sequence according to the element index corresponding to each to-be-rendered element.

In an embodiment, the determining module 803 is further configured to acquire element shape information corresponding to the to-be-rendered element that is not found if the to-be-rendered element is not found from the element bitmap, allocate a drawing area in the empty area of the element bitmap for the to-be-rendered element that is not found based on the element shape information, draw the to-be-rendered element that is not found in the allocated drawing area in the element bitmap to update the element bitmap, and determine an arrangement position of the drawn to-be-rendered element in the updated element bitmap based on the drawing area.

In an embodiment, the determining module 803 is further configured to acquire element boundary measurement information corresponding to the to-be-rendered element that is not found through an element boundary information acquisition interface and an element measurement interface if the to-be-rendered element is not found from the element bitmap, and correct the element boundary measurement information according to a preset rule, to obtain the element shape information corresponding to the to-be-rendered element that is not found.

In an embodiment, the determining module 803 is further configured to allocate a drawing area in the empty area adjacent to elements included in the element bitmap for the to-be-rendered element that is not found based on the element shape information, and draw the to-be-rendered element that is not found in the allocated drawing area in the element bitmap to update the element bitmap, the elements drawn in the element bitmap being arranged closely.

In an embodiment, the determining module 803 is further configured to determine an empty space of the element bitmap if the to-be-rendered element is not found from the element bitmap, clear the elements included in the element bitmap if the empty space is less than a preset space, and draw the to-be-rendered element that is not found in the empty area of the element bitmap and determine the arrangement position of the drawn to-be-rendered element in the element bitmap if the empty space is greater than or equal to the preset space.

Figure 9:
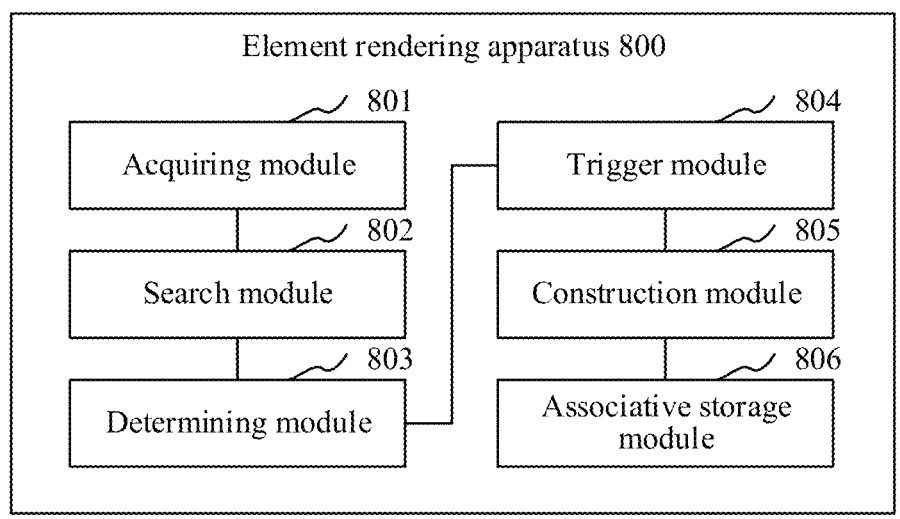
FIG. 9 is a structural block diagram of an element rendering apparatus according to another embodiment.

As shown in FIG. 9, in an embodiment, the element rendering apparatus further includes a construction module 805 and an associative storage module 806. The determining module 803 is further configured to determine an element coding value and element attribute information corresponding to the to-be-rendered element drawn in the element bitmap. The construction module 805 is configured to construct an element index based on the determined element coding value and element attribute information. The associative storage module 806 is configured to store the constructed element index and the corresponding arrangement position of the to-be-rendered element in the element bitmap in association with each other.

In an embodiment, the determining module 803 is further configured to determine element spacing information corresponding to each to-be-rendered element. The trigger module 804 is further configured to trigger to render and display each to-be-rendered element at the corresponding target display position based on the element bitmap including each to-be-rendered element and the arrangement position of each to-be-rendered element in the element bitmap as well as the element spacing information corresponding to each to-be-rendered element after determining the arrangement position of each to-be-rendered element in the element bitmap.

In an embodiment, the trigger module is further configured to generate an element texture map based on the element bitmap including each to-be-rendered element after determining the arrangement position of each to-be-rendered element in the element bitmap, and trigger to render and display each to-be-rendered element at a corresponding target display position based on the element texture map and the arrangement position of each to-be-rendered element in the element bitmap.

The term module (and other similar terms such as unit, submodule, subunit, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The element rendering apparatus acquires at least one to-be-rendered element and a target display position corresponding to each to-be-rendered element. A locally stored element bitmap is searched for each to-be-rendered element in sequence, and if a to-be-rendered element is found from the element bitmap, a quick response can be made by directly triggering the rendering display operation through historically drawn elements, which greatly reduces the drawing time of the to-be-rendered element. When a to-be-rendered element is not found from the element bitmap, the to-be-rendered element that is not found is drawn in an empty area of the element bitmap, to update the element bitmap. The rendering display operation is triggered according to the updated element bitmap and the arrangement position of the to-be-rendered element in the element bitmap. Moreover, the drawn elements are stored on the element bitmap, and next time an element already drawn is to be rendered, the element can be directly displayed on the screen. Any elements can be drawn and rendered efficiently, without adding an additional library file or font file, which is flexible and convenient and has high practicability.

Figure 10:
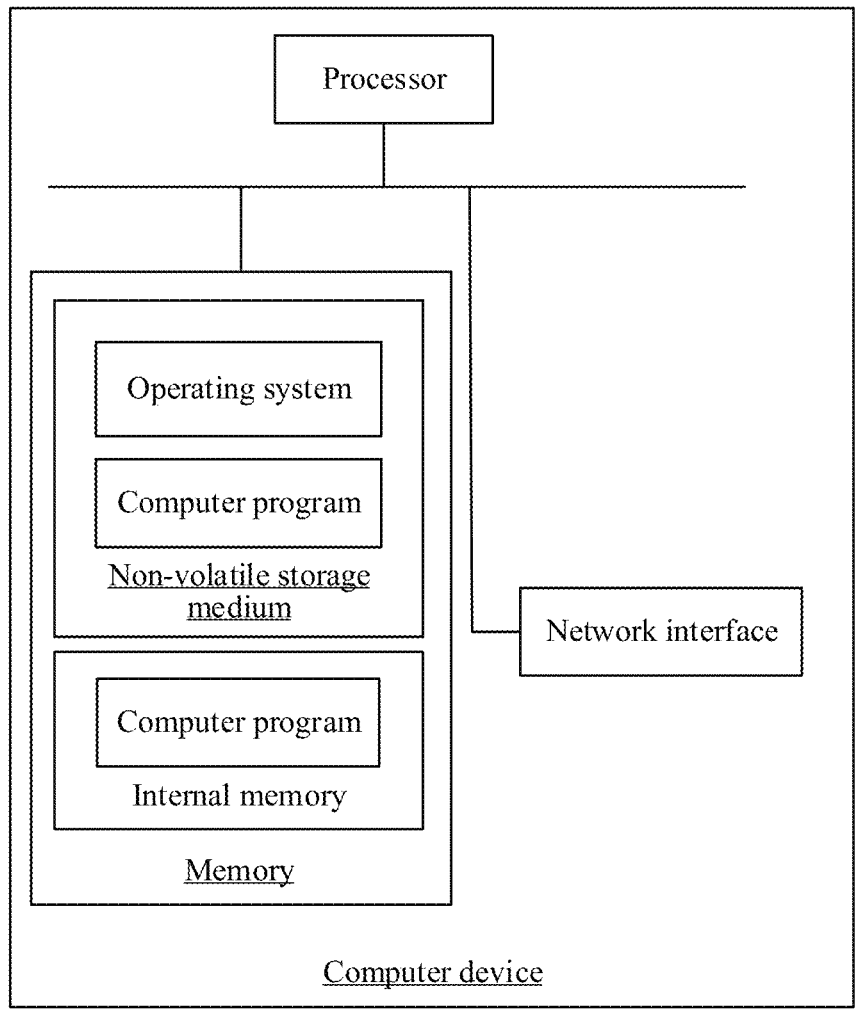
FIG. 10 is a structural block diagram of a computer device according to an embodiment.

FIG. 10 is a diagram of an internal structure of a computer device according to an embodiment. The computer device may be specifically the terminal 110 or the server 120 in FIG. 1. As shown in FIG. 10, the computer device includes a processor, a memory, and a network interface connected by a system bus. The memory includes a non-volatile storage medium and an internal memory. The non-volatile storage medium of the computer device stores an operating system and may further store a computer program. The computer program, when executed by the processor, may cause the processor to implement the element rendering method. The internal memory may also store a computer program. The computer program, when executed by the processor, may cause the processor to perform the element rendering method.

A person skilled in the art may understand that, the structure shown in FIG. 10 is only a block diagram of a part of a structure related to a solution of this disclosure and does not limit the computer device to which the solution of this disclosure is applied. Specifically, the computer device may include more or fewer members than those in the drawings, or include a combination of some members, or include different member layouts.

In an embodiment, the element rendering apparatus provided in this disclosure may be implemented in a form of a computer program, and the computer program may run on the computer device shown in FIG. 10. A memory of the computer device may store program modules forming the element rendering apparatus, for example, the acquiring module, the search module, the determining module and the trigger module shown in FIG. 8. The computer program formed by the program modules causes the processor to perform the steps in the element rendering method in the embodiments of this disclosure described in this specification.

For example, the computer device shown in FIG. 10 may perform step S202 by using the acquiring module in the element rendering apparatus shown in FIG. 8. The computer device may perform step S204 by using the search module. The computer device may perform steps S206 and S208 by using the determining module. The computer device may perform step S210 by using the trigger module.

In an embodiment, a computer device is provided, including a processor and a memory. The memory stores a computer program, the computer program, when executed by the processor, causing the processor to perform the steps of the foregoing element rendering method. Herein, the steps of the element rendering method may be the steps of the element rendering method in the foregoing embodiments.

In an embodiment, a computer-readable storage medium is provided, storing a computer program, the computer program, when executed by a processor, causing the processor to perform the steps of the foregoing element rendering method. Herein, the steps of the element rendering method may be the steps of the element rendering method in the foregoing embodiments.

A person of ordinary skill in the art may understand that all or some of procedures of the method in the foregoing embodiments may be implemented by a computer program instructing relevant hardware. The program may be stored in a non-volatile computer-readable storage medium. When the program is executed, the procedures of the foregoing method embodiments may be implemented. References to the memory, the storage, the database, or other media used in the embodiments provided in this disclosure may all include a non-volatile or a volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a RAM or an external cache. By way of description rather than limitation, the RAM may be obtained in a plurality of forms, such as a static RAM (SRAM), a dynamic RAM (DRAM), a synchronous DRAM (SDRAM), a double data rate SDRAM (DDRSDRAM), an enhanced SDRAM (ESDRAM), a Synchlink DRAM (SLDRAM), a Rambus direct RAM (RDRAM), a direct rambus dynamic RAM (DRDRAM), and a rambus dynamic RAM (RDRAM).

Technical features of the foregoing embodiments may be randomly combined. To make description concise, not all possible combinations of the technical features in the foregoing embodiments are described. However, the combinations of these technical features shall be considered as falling within the scope recorded by this specification provided that no conflict exists. The foregoing embodiments show only several implementations of this disclosure and are described in detail, which, however, are not to be construed as a limitation to the patent scope of this disclosure. For a person of ordinary skill in the art, several transformations and improvements can be made without departing from the idea of this disclosure. These transformations and improvements belong to the protection scope of this disclosure. Therefore, the protection scope of the patent of this disclosure shall be subject to the appended claims.

What is claimed is:

1. An element rendering method to be performed by a computer device, comprising:
  acquiring at least one to-be-rendered element and at least one corresponding target display position by:
    receiving at least one input of the at least one to-be-rendered element;
    determining at least one input position corresponding to the at least one to-be-rendered element when the at least one to-be-rendered element is detected; and
    determining, based on the at least one input position, the at least one target display position corresponding to the at least one to-be-rendered element;
  searching a locally stored element bitmap for the at least one to-be-rendered element to obtain a search result;
  determining at least one arrangement position of the at least one to-be-rendered element in the element bitmap according to the search result; and
  after determining the at least one arrangement position of the at least one to-be-rendered element in the element bitmap, initiating rendering and displaying the at least one to-be-rendered element at at least one corresponding target display position based on the element bitmap and the at least one arrangement position of the at least one to-be-rendered element in the element bitmap.

2. The method according to claim 1, wherein acquiring the at least one to-be-rendered element and the at least one corresponding target display position further comprises:
  displaying a display interface to receive the at least one input of the at least one to-be-rendered element.

3. The method according to claim 1, wherein searching the locally stored element bitmap for the at least one to-be-rendered element in sequence comprises:
  determining at least one element coding value and element attribute information corresponding to the at least one to-be-rendered element;
  determining, based on the at least one element coding value and the element attribute information, at least one element index corresponding to the at least one to-be-rendered element; and
  searching the locally stored element bitmap for the at least one to-be-rendered element according to at least one element index.

4. The method according to claim 1, wherein determining the at least one arrangement position of the at least one to-be-rendered element in the element bitmap according to the search result, comprising:
  when the at least one to-be-rendered element is found from the element bitmap, determining the at least one arrangement position of the at least one to-be-rendered element in the element bitmap; or
  when the at least one to-be-rendered element is absent from the element bitmap, drawing the at least one absent to-be-rendered element in an empty area of the element bitmap and determining at least one arrangement position of the drawn to-be-rendered element in the element bitmap.

5. The method according to claim 4, wherein drawing the at least one absent to-be-rendered element in the empty area of the element bitmap, and determining the at least one arrangement position of the drawn to-be-rendered element in the element bitmap comprises:
  acquiring element shape information corresponding to the at least one absent to-be-rendered element;
  allocating at least one drawing area in the empty area of the element bitmap for the at least one absent to-be-rendered element based on the element shape information;
  drawing the at least one absent to-be-rendered element in the at least one allocated drawing area in the element bitmap to update the element bitmap; and
  determining the at least one arrangement position of the drawn to-be-rendered element in the updated element bitmap based on the drawing area.

6. The method according to claim 5, wherein acquiring the element shape information corresponding to the at least one absent d to-be-rendered element comprises:
  acquiring element boundary measurement information corresponding to the at least one absent to-be-rendered element through an element boundary information acquisition interface and an element measurement interface; and
  correcting the element boundary measurement information according to a preset rule to obtain the element shape information corresponding to the at least one absent to-be-rendered element.

7. The method according to claim 5, wherein allocating the at least one drawing area in the empty area of the element bitmap for the at least one absent to-be-rendered element based on the element shape information comprises:
  allocating the at least one drawing area in the empty area adjacent to elements comprised in the element bitmap for the at least one absent to-be-rendered element based on the element shape information;
  wherein drawing the at least one absent to-be-rendered element in the allocated at least one drawing area in the element bitmap to update the element bitmap comprises:
  drawing the at least one absent to-be-rendered element in the allocated at least one drawing area in the element bitmap to update the element bitmap, the elements drawn in the element bitmap being arranged in a dense packing manner.

8. The method according to claim 4, wherein drawing the at least one absent to-be-rendered element in the empty area of the element bitmap and determining the at least one arrangement position of the drawn to-be-rendered element in the element bitmap comprises:
  determining an empty space of the element bitmap;
  when the empty space is less than or equal to a preset space, clearing the elements comprised in the element bitmap; and
  when the empty space is greater than the preset space, executing the operation of drawing the at least one absent to-be-rendered element in the empty area of the element bitmap and determining the at least one arrangement position of the drawn to-be-rendered element in the element bitmap.

9. The method according to claim 4, wherein drawing the at least one absent to-be-rendered element in the empty area of the element bitmap and determining the at least one arrangement position of the drawn to-be-rendered element in the element bitmap, further comprise:
  determining at least one element coding value and element attribute information corresponding to the at least one to-be-rendered element drawn in the element bitmap;
  constructing at least one element indexes based on the at least one element coding value and the element attribute information; and storing the at least one element indexes and the at least one corresponding arrangement position of the at least one to-be-rendered element in the element bitmap in association with each other.

10. The method according to claim 1, further comprising: determining element spacing information corresponding to the at least one to-be-rendered element;
wherein initiating rendering and displaying the at least one to-be-rendered element at the at least one corresponding target display position based on the element bitmap of the at least one to-be-rendered element and the at least one arrangement position of the at least one to-be-rendered element in the element bitmap comprises:
initiating rendering and displaying the at least one to-be-rendered element at the at least one corresponding target display position based on the element bitmap of the at least one to-be-rendered element, the at least one arrangement position of the at least one to-be-rendered element in the element bitmap, and the element spacing information corresponding to the at least one to-be-rendered element.

11. The method according to claim 1, wherein initiating rendering and displaying the at least one to-be-rendered element at the at least one corresponding target display position comprises:
generating an element texture map based on the element bitmap comprising the at least one to-be-rendered element; and
initiating rendering and displaying the at least one to-be-rendered element at the at least one corresponding target display position based on the element texture map and the at least one arrangement position of the at least one to-be-rendered element in the element bitmap.

12. The method according to claim 11, wherein initiating rendering and displaying the at least one to-be-rendered element at the at least one corresponding target display position comprises:
calling a graphics rendering interface to initiate rendering and displaying the at least one to-be-rendered element at the at least one corresponding target display position based on the element texture map and the at least one arrangement position of the at least one to-be-rendered element in the element bitmap.

13. An element rendering apparatus, comprising:
an acquiring module, configured to acquire at least one to-be-rendered element and at least one corresponding target display position by:
receiving at least one input of the at least one to-be-rendered element;
determining at least one input position corresponding to the at least one to-be-rendered element when the at least one to-be-rendered element is detected; and
determining, based on the at least one input position, the at least one target display position corresponding to the at least one to-be-rendered element;
a search module, configured to search a locally stored element bitmap for the at least one to-be-rendered element in sequence to obtain a search result;
a determining module, configured to determine at least one arrangement position of the at least one to-be-rendered element in the element bitmap according to the search result; and
an initiating module, configured to initiate rendering and displaying the at least one to-be-rendered element at the at least one corresponding target display position based on the element bitmap and the at least one arrangement position of the at least one to-be-rendered element in the element bitmap after determining the at least one arrangement position of the at least one to-be-rendered element in the element bitmap.

14. The apparatus according to claim 13, wherein the acquiring module is further configured to:
display a display interface to receive the at least one input of the at least one to-be-rendered elementt.

15. A non-transitory computer-readable storage medium, having at least one computer program stored therein, the at least one computer program, when executed by at least one processor, causing the at least one processor to perform the method of claim 1.

16. A computer device, comprising at least one memory and at least one processor, the at least one memory storing at least one computer program, the at least one computer program, when executed by the at least one processor, causing the at least one processor to perform the following steps, comprising:
acquiring at least one to-be-rendered element and at least one corresponding target display position by:
receiving at least one input of the at least one to-be-rendered element;
determining at least one input position corresponding to the at least one to-be-rendered element when the at least one to-be-rendered element is detected; and
determining, based on the at least one input position, the at least one target display position corresponding to the at least one to-be-rendered element;
searching a locally stored element bitmap for the at least one to-be-rendered element to obtain a search result;
determining at least one arrangement position of the at least one to-be-rendered element in the element bitmap according to the search result; and
after determining the at least one arrangement position of the at least one to-be-rendered element in the element bitmap, initiating rendering and displaying the at least one to-be-rendered element at at least one corresponding target display position based on the element bitmap and the at least one arrangement position of the at least one to-be-rendered element in the element bitmap.

17. The computer device according to claim 16, wherein the at least one processor is further configured to acquire the at least one to-be-rendered element and the at least one corresponding target display position by performing, when executing the at least one program, the steps comprising:
displaying a display interface to receive the at least one input of the at least one to-be-rendered element.

18. The computer device according to claim 16, wherein the at least one processor is further configured to search the locally stored element bitmap for the at least one to-be-rendered element in sequence by performing, when executing the at least one program, the steps comprising:
determining at least one element coding value and element attribute information corresponding to the at least one to-be-rendered element;
determining, based on the at least one element coding value and the element attribute information, at least one element index corresponding to the at least one to-be-rendered element; and
searching the locally stored element bitmap for the at least one to-be-rendered element according to at least one element index.

19. The computer device according to claim 16, wherein the at least one processor is further configured to determine the at least one arrangement position of the at least one to-be-rendered element in the element bitmap according to the search result by performing, when executing the at least one program, the steps comprising:

when the at least one to-be-rendered element is found from the element bitmap, determining the at least one arrangement position of the at least one to-be-rendered element in the element bitmap; or when the at least one to-be-rendered element is absent from the element bitmap, drawing the at least one absent to-be-rendered element in an empty area of the element bitmap and determining at least one arrangement position of the drawn to-be-rendered element in the element bitmap.

20. The computer device according to claim 19, wherein the at least one processor is further configured to draw the at least one absent to-be-rendered element in the empty area of the element bitmap and determine the at least one arrangement position of the drawn to-be-rendered element in the element bitmap by performing, when executing the at least one program, the steps comprising:

acquiring element shape information corresponding to the at least one absent to-be-rendered element;

allocating at least one drawing area in the empty area of the element bitmap for the at least one absent to-be-rendered element based on the element shape information;

drawing the at least one absent to-be-rendered element in the at least one allocated drawing area in the element bitmap to update the element bitmap; and determining the at least one arrangement position of the drawn to-be-rendered element in the updated element bitmap based on the drawing area.

\* \* \* \* \*

UNITED STATES PATENT AND TRADEMARK OFFICE
CERTIFICATE OF CORRECTION

| | |
|---|---|
| PATENT NO. | : 11,741,648 B2 |
| APPLICATION NO. | : 17/354313 |
| DATED | : August 29, 2023 |
| INVENTOR(S) | : Danxiong Lei |

It is certified that error appears in the above-identified patent and that said Letters Patent is hereby corrected as shown below:

In the Claims

Column 28, Claim 14, Line 8, delete "elementt." and insert in its place --element.--

Signed and Sealed this
Seventeenth Day of October, 2023

Katherine Kelly Vidal
*Director of the United States Patent and Trademark Office*